United States Patent [19]
Kutay et al.

[11] 4,078,629
[45] Mar. 14, 1978

[54] VERTICALLY MOVABLE OPERATOR'S COMPARTMENT FOR A SELF-PROPELLED MINE VEHICLE

[75] Inventors: Carl Kutay, Moundsville, W. Va.; Scott Wamsley; Henry B. DeLong, both of St. Clairsville, Ohio

[73] Assignee: Consolidation Coal Company, Pittsburgh, Pa.

[21] Appl. No.: 690,364

[22] Filed: May 26, 1976

[51] Int. Cl.² ............................................. B62D 33/06
[52] U.S. Cl. ................................ 180/89.13; 296/28 C
[58] Field of Search ................ 180/77 MC, 77 S, 1 R, 180/89.1, 89.12, 89.13; 296/137 B, 26, 28 C, 102

[56] References Cited
U.S. PATENT DOCUMENTS

| | | | |
|---|---|---|---|
| 2,282,749 | 5/1942 | Russell | 180/77 MC |
| 3,053,562 | 9/1962 | Farber | 296/26 |
| 3,067,830 | 12/1962 | Lee | 180/45 |
| 3,675,966 | 7/1972 | Luft | 296/28 C |
| 3,866,781 | 2/1975 | Stedman | 180/77 MC X |

FOREIGN PATENT DOCUMENTS

| | | | |
|---|---|---|---|
| 1,217,802 | 5/1966 | Germany | 180/89.13 |
| 1,260,995 | 2/1968 | Germany | 180/89.13 |

*Primary Examiner*—Robert R. Song
*Attorney, Agent, or Firm*—William A. Mikesell, Jr.; Stanley J. Price, Jr.

[57] ABSTRACT

A self-propelled vehicle for transporting dislodged material out of a mine includes a mobile body supported on driven wheels and vertical side walls that define a material haulage compartment. The vehicle is controlled from an operator's compartment that is positioned adjacent the outboard side of one of the mobile body side walls. The operator's compartment is movable relative to the side wall by a pair of vertically extending guide rails that are rigidly secured to the side wall of the operator's compartment opposite the side wall of the mobile body. A pair of vertically extending guideways are secured to the body side wall and slidably receive the guide rails. The guide rails move in the guideways to permit movement of the operator's compartment on the body side wall as the bottom portion of the comparment contacts the mine floor as the vehicle travels over the uneven undulating mine floor. A stop mechanism on the compartment prevents the guide rails from sliding out of the guideways. With the operator's compartment resting on the mine floor additional vertical clearance is provided for installation of a protective overhead canopy above the compartment.

13 Claims, 6 Drawing Figures

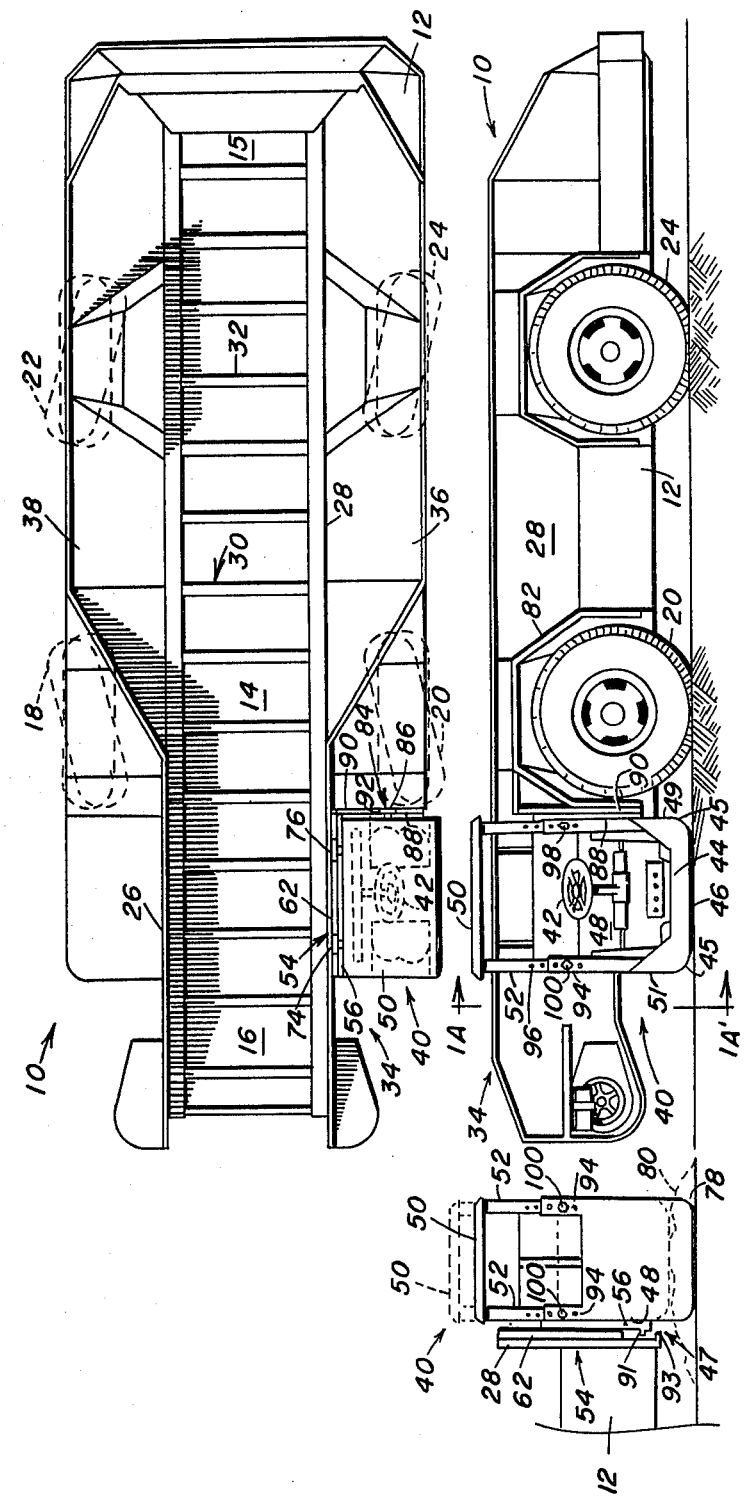

VERTICALLY MOVABLE OPERATOR'S COMPARTMENT FOR A SELF-PROPELLED MINE VEHICLE

BACKGROUND OF THE INVENTION

1. Field of the Invention

This invention relates to an operator's compartment that is supported for independent up and down movement on the side wall of a self-propelled mine vehicle, and more particularly to an operator's compartment arranged to move upwardly and downwardly independently of the up and down movement of the vehicle as the mine vehicle moves over the uneven surface of the mine floor.

2. Description of the Prior Art

Self-propelled haulage vehicles, such as shuttle cars, are used in mines for transporting dislodged material from a mining or loading machine out of the mine. The shuttle car includes a longitudinally extending compartment in which the mined material is loaded, and after loading the shuttle car moves from an area adjacent the mine face to a fixed haulage system where the coal is discharged from the shuttle car onto a conveyor belt.

The shuttle car is controlled from an operator's compartment that is rigidly secured to the side wall of the vehicle. Suitable controls are provided on the operator's compartment by which the operator controls the movement of the vehicle between the mine face and the discharge point and also operates the conveyor of the haulage compartment.

The machine operator in the operator's compartment is exposed to the mine roof and is, therefore, subject to serious injury from falling debris. It is known to utilize overhead canopies for protecting operators of various equipment in a mine from the hazard of roof falls. For a shuttle car, however, the limited overhead clearance above the operator's compartment does not permit installation of a canopy particularly when the car operates in mine seam heights of less than 40 inches. With the operator's compartment fixed on the vehicle and raised above the mine floor to provide the necessary ground clearance between the bottom of the compartment and the mine floor, there is insufficient clearance above the top of the shuttle car for the installation of an overhead protective canopy. Also, where there is little clearance between the top of the canopy and the mine roof, the canopy will strike the mine roof as the shuttle car bounces when it moves over the uneven undulating mine floor.

It is known to pivotally connect the front end portion of a canopied operator's compartment to a mining machine with the rear end portion resting on the mine floor and arranged to drag on the mine floor as the machine advances in the mine entry. When the mining machine advances in an entry, the front end of the machine tends to dip downwardly raising the rear end of the machine. With the pivotal arrangement, the compartment rear end portion remains on the mine floor so that the canopy does not strike the mine roof. The front end of the operator's compartment is, however, connected to the mining machine so that the upward and downward movement of the mining machine is transmitted to the operator's compartment through the pivot connection. The canopy may be either vertically fixed or adjustable.

There is need for positioning an operator's compartment on a mine haulage vehicle that permits installation of a protective overhead clearance for operation in seams of low height. While it has been suggested to provide operator protective canopies, the prior art devices do not compensate for mine floor conditions that reduce the overhead clearance.

SUMMARY OF THE INVENTION

In accordance with the present invention there is provided a self-propelled vehicle for use in a mine that includes a mobile body portion and ground traction means for supporting the mobile portion for movement in the mine. An operator's compartment is positioned adjacent the vehicle body portion. A connecting assembly supports the operator's compartment for independent upward and downward movement of the operator's compartment on the vehicle body portion so that the operator's compartment is free to move independently of the mobile body as the mobile body moves over the irregular contour of the mine floor.

The operator's compartment includes a protective canopy that is secured to the body portion of the compartment and serves to protect the operator from solid material dislodging from the mine roof. By supporting the operator's compartment for movement on the body portion of the vehicle, the bottom portion of the compartment remains in contact with the mine floor and thus provides additional overhead clearance for the installation of the protective canopy. With the additional overhead clearance, the top surface of the protective canopy remains displaced from contact with the mine roof as the vehicle travels over the uneven and undulating mine floor. The canopy is supported by vertical members that are secured to the body portion of the compartment to permit vertical adjustment of the position of the canopy relative to the top of the vehicle side wall. Thus, the canopy may be raised or lowered on the compartment as necessitated by the clearance between the top of the side wall and the mine roof.

The connecting mechanism includes a pair of vertically positioned, spaced parallel guide rails. The guide rails are secured to the side wall of the operator's compartment and are slidably received within vertical guideways of a plate member that is rigidly secured to the side wall of the vehicle. The guideways include recessed portions having a configuration of the guide rails so that the guide rails are retained within the recessed portions for vertical movement as the bottom portion of the compartment follows the uneven contour of the mine floor. In a similar arrangement, a guide rail secured to the front wall of the compartment adjacent the wheel fender is slidably received within a vertical guideway that is secured to the fender. This provides additional support for vertical movement of the operator's compartment on the vehicle body portion. A stop mechanism comprising coacting members on the operator's compartment and vehicle side wall serve to prevent the guide rails from sliding out of the guideways, particularly when the operator's compartment moves downwardly relative to the vehicle because of a recess in the mine floor.

The bottom portion of the operator's compartment rests on the mine floor as the vehicle moves over the undulations of the mine floor. The vertical position of the operator's compartment on the vehicle varies as the vehicle moves over the uneven contour of the mine floor. The stop mechanism limits the downward movement of the compartment when the vehicle moves over severe depressions in the mine floor. With this arrangement of supporting the compartment for vertical movement on the vehicle clearance is provided for installation of the protective canopy above the compartment. The canopy remains spaced from the mine roof as the operator's compartment moves upwardly and downwardly on the body portion of the vehicle.

Accordingly, the principle object of the present invention is to provide an operator's compartment for a self-propelled mine vehicle in which the operator's compartment is movably supported on the body portion of the vehicle such that when the vehicle moves over the uneven surface of the mine floor, the entire compartment follows the contour of the mine floor.

Another object of the present invention is to provide an operator's compartment that is independently movable relative to the side wall of a self-propelled vehicle so that the bottom portion of the compartment slides on the uneven surface of the mine floor to provide additional overhead clearance for the installation of a protective canopy on the operator's compartment and permit operation of the vehicle in mineral seams of low height.

These and other objects of the present invention will be more completely disclosed and described in the following specification, the accompanying drawings and the appended claims.

BRIEF DESCRIPTION OF THE DRAWINGS

FIG. 1 is a view in side elevation of a mine shuttle car, illustrating a protected operator's compartment movably supported on the body portion of the shuttle car.

FIG. 2 is a top plan view of FIG. 1.

FIG. 1A is a fragmentary view in end elevation taken along line 1A–1A' of FIG. 1, illustrating by the dotted lines the vertical movement of the operator's compartment as the compartment slides on the surface of the mine floor upon movement of the shuttle car.

DESCRIPTION OF THE PREFERRED EMBODIMENT

Figure 3:
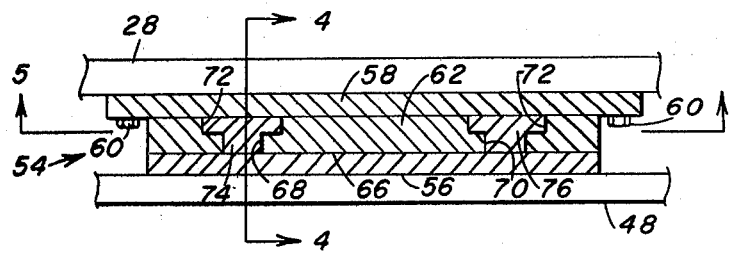
FIG. 3 is an enlarged fragmentary top plan view partially in section of the connection of the operator's compartment to the body portion of the shuttle car, illustrating a pair of guide rails secured to the operator's compartment and arranged for vertical movement in guideways mounted on the shuttle car side wall.

Referring to the drawings and particularly to FIGS. 1, 1A and 2 there is illustrated a mine haulage vehicle, such as a shuttle car, generally designated by the numeral 10 that includes a body portion 12 and a material receiving compartment 14 and a material discharge end portion 16. The body portion 12 is mounted on a pair of front traction wheels 18 and 20 and a pair of rear traction wheels 22 and 24. The wheels 18 and 24 are mounted adjacent to side walls 26 and 28 of the body 12 with the haulage compartment 14 extending therebetween. The haulage compartment 14 has a conventional endless flight conveyor 30 extending along its bottom portion.

The flight conveyor 30 includes a plurality of cross flights 32 that are propelled by suitable side chains (not shown). The discharge end of the conveyor 30 extends along a tiltable end frame 34 which is pivotally arranged to effect variations in the discharge height of the vehicle discharge end portion 16. The endless conveyor 30 is propelled by a pair of sprockets that are secured to a cross shaft which is propelled by a suitable prime mover. Further details of the shuttle car which are beyond the scope of the present invention are illustrated and described in U.S. Pat. No. 3,067,830.

The haulage vehicle or shuttle car 10 has adjacent the discharge end portion 16 and at one side of the material receiving compartment 14 a compartment 36 in which a suitably prime mover is positioned. A second prime mover, as desired, may be positioned on the opposite side of the haulage vehicle in the compartment 38 between wheels 18 and 20. An operator's compartment generally designated by the numeral 40 is positioned adjacent the discharge end portion 16 and is movably supported on the vehicle body portion in accordance with the present invention. The operator's compartment 40 serves as a station for the operator and has a suitable steering wheel 42 and the other necessary controls by which the vehicle may be operated and steered.

The operator's compartment 40 has a body portion 44 and a bottom portion 46 that is connected to the body portion 44 by the rounded edge portions 45. A stop mechanism, generally designated by the numeral 47, provided on the vehicle side wall 28 and the operator's compartment 40 limits the downward movement of the compartment. In one embodiment, the stop mechanism 47 is located on side wall 28 and compartment 40 to maintain the compartment 40 a preselected height above the mine floor, for example, 4 inches. With this arrangement, as the vehicle body portion 12 traverses the uneven contour of the mine floor, mine floor elevations above the bottom portion 46 contact the bottom portion 46 to urge the operator's compartment 40 upwardly on the side wall 28.

In another embodiment of the present invention, the stop mechanism 47 is located on the compartment 40 and side wall 28 to permit downward movement of the compartment to an elevation preferably 1 inch below the surface of the mine floor. Thus, for movement of the vehicle 10 over a severe depression in the mine floor, the bottom portion 46 remains displaced from the surface of the depression with the bottom portion 46 arranged to remain in contact with the level portion of the mine floor. This has particular application when the tiltable end frame 34 is pivoted upwardly. The stop mechanism 47 limits the downward movement of the compartment 40 on the side wall 28. Thus, the bottom portion 46 follows the undulations in the mine floor with the compartment body portion 44 moving vertically or "floating" on the vehicle body portion 12 as the vehicle 10 moves over the uneven mine floor.

The compartment body portion 46 includes a vertical side wall 48 positioned adjacent to the vehicle side wall 28. The opposite side of compartment 40 is open to provide ingress and egress into and out of the compartment. The compartment is enclosed by front and rear walls 49 and 51. A protective overhead canopy 50 overlies the operator's compartment 40 and is supported thereabove by vertical members 52 that extend upwardly from the body portion 44 and are vertically adjustable as explained hereinafter to effect variations in the height of the canopy 50 above the compartment body portion 44. The operator's compartment side wall 48 is secured for vertical movement on the vehicle body portion 12 by a connecting assembly generally designated by the numeral 54, illustrated in detail in FIGS. 3-5. The connecting mechanism 54 includes a first vertical plate member 56 that is secured to the compartment side wall 48 and a vertical plate member 58 that is suitably secured such as by bolts 60 to the vehicle side wall 28. A guide plate portion 62 of plate member 58 is positioned in abutting relation with compartment plate member 56. The outer surface 66 of guide plate 62 is slidable relative to the outer surface of the plate member 56.

Figures 4, 5:
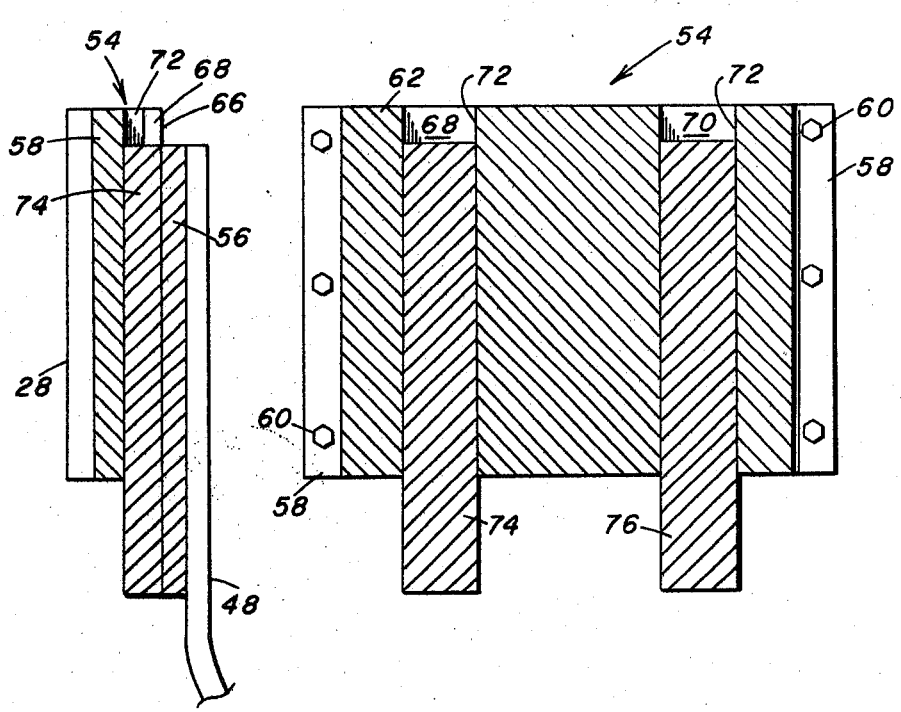
FIG. 4 is a sectional view taken along 4–4' of FIG. 3, illustrating the guide rails arranged for vertical movement in the recess portions of the guideways.
FIG. 5 is a sectional view taken along line 5–5' of FIG. 3, illustrating the positioning of the guide rails in the guideways that are bolted to the side wall of the shuttle car.

The guide plate 62 has a pair of spaced parallel, vertically extending guideways 68 and 70. Each of the guideways 68 and 70 includes an expanded recess portion 72 that is arranged to slidably receive vertically extending rail members 74 and 76 that are rigidly secured in spaced parallel relation to the outer surface of the plate member 56. The recess portions 72 of guideways 68 and 70 have a preselected configuration that corresponds with the configuration of the guide rails 74 and 76, respectively. As illustrated in FIGS. 3-5, the rails 74 and 76 may have a T-bar configuration. With the guideways 68 and 70 having a configuration corresponding to that of the guide rails 74 and 76, the complementary surfaces of the guideways 68 and 70 and the guide rails 74 and 76 are positioned in abutting relationship for vertical movement of the guide rails 74 and 76 in the recess portions 72.

Not only is the operator's compartment 40 supported for vertical movement by connection of the guide rails 74 and 76 to the guideways 68 and 70 of the guide plate 62 on the vehicle side wall 28 but is also connected for vertical movement on wheel fender 82 positioned adjacent the compartment front wall 49. A connecting mechanism generally designated by the numeral 84 and illustrated in FIGS. 1 and 2 supports the front wall 49 for vertical movement on the fender 82. The connecting mechanism 84 is similar to the connecting mechanism 54 illustrated in detail in FIGS. 3-5. The connecting mechanism 84 includes a vertical extending guide rail 86 that is rigidly secured to a plate member 88 that is, in turn, secured to the front wall 49 of the compartment 40. A guide plate 90 is rigidly secured to the portion of the fender 82 adjacent the front wall 49 and includes a recess portion 92 having a configuration of the guide rail 86 for slidably receiving the guide rail. The connecting mechanism 54 may also include a stop mechanism (not shown) similar to stop mechanism 47 above described for limiting the downward movement of the compartment body portion 44 on the wall 49.

The stop mechanism 47, illustrated in FIG. 1A, includes a flange portion 91 that is secured to and extends outwardly from the lower portion of the compartment side wall 48. A coacting flange 93 extends outwardly from the vehicle side wall 28 and is secured thereto at a position whereby downward movement of the compartment 40 to bring flange 91 into contact with the upper surface of flange 93 on side wall 28 impedes further downward movement of compartment 40 on side wall 28. With this arrangement downward movement of the compartment 44 is limited. The relative positions of the flanges 91 and 93 determine the elevation the compartment bottom portion 46 assumes above a level portion of the mine floor. Thus, a rise in the elevation above the lowermost position of the compartment 40 brings the bottom portion 46 into contact with the uneven portion of the mine floor urging the compartment upwardly. Preferably, the flanges 91 and 93 of the stop mechanism 47 are located to limit downward movement of compartment 40 a preselected distance below a level portion of the mine floor, preferably one inch with the bottom portion 46 remaining in contact with the level portions of the mine floor. When the compartment 40 passes over a depression greater than 1 inch below the level portion of the mine floor, the compartment is prevented from further downward movement. This arrangement has further application to prevent the guide rails 74 and 76 from sliding out of the guideways 68 and 70 when the shuttle car 10 advances up a ramp to discharge the mined material.

With the operator's compartment 40 supported for vertical movement on the body portion 12 of the vehicle 10 in the manner above described, the bottom portion 46 remains at a preselected elevation above the level portion of the mine floor or in contact with the floor of the mine and consequently follows in a "floating" fashion the contour of the mine floor surface. With this arrangement of supporting the compartment 40 for vertical movement on the vehicle side wall 28 additional clearance above the vehicle body portion 12 is provided for the installation of the overhead canopy 50. The overhead canopy functions to protect the vehicle operator positioned in the compartment 40 from the hazard of falling material dislodged from the mine roof, as in the case of a roof fall. In addition as the shuttle car 10 operates in the mine to transfer the mined material out of the mine, the operator's compartment 40 moves vertically as the shuttle car moves over uneven portions of the mine floor. Movement of the compartment 40 on the mine floor is enhanced by the contoured edge portions 45 of the bottom portion 46. Thus, when the bottom portion 44 contacts the mine floor, the body portion 46 moves vertically on the vehicle body portion 12 in response to the undulations in the mine floor.

The vertical movement of the operator's compartment 40 on the vehicle body portion 12 is illustrated in FIG. 1A. With the bottom portion 46 positioned to travel on level portions of the mine floor, a change in the contour of the mine floor urges the operator's compartment 40 to rise and fall or float in response to the surface roughness of the mine floor. For example as illustrated in FIG. 1A, the tramming shuttle car 10 moves the compartment 40 with the bottom portion 44 in contact with a level portion 78 of the mine floor to an uneven portion 80 indicated by the dashed lines. The compartment 40 moves upwardly on the side wall 28 and wheel fender 82 as the bottom portion 46 advances from floor elevation 78 to floor elevation 80. Thus the compartment 40 resting on the mine floor additional overhead clearance is available for positioning the canopy 50 above the compartment 40.

By rigidly securing the compartment to the vehicle body portion in the conventional manner it is not possible to install a protective canopy on the compartment because of the limited overhead clearance that would exist between the top of the canopy and the mine roof. However, with the present invention additional overhead clearance is provided by positioning the compartment 40 for vertical movement on the shuttle car 10. When the compartment body portion 44 contacts the uneven surface of the mine floor, the body portion 44 rises but the upper surface of the canopy 50 remains spaced from the mine roof, as for example, when the compartment transverses from floor elevation 78 to floor elevation 80 because the body portion is vertically movable. With a conventionally mounted operator's compartment rigidly fixed on the vehicle, however, the top of the canopy would be jammed against the mine roof when the vehicle moves over uneven portions of the mine floor, particularly when operating in mines having a mineral seam height of less than 40 inches. By movably supporting the operator's compartment 40 on the vehicle body portion 12 as described hereinabove, additional clearance is provided between the top of the canopy 50 and the mine roof to permit vertical movement of the compartment 40 without the canopy 50 striking the mine roof.

To effect variations in the height of the canopy above the body portion 12 of the vehicle 10, the vertical members 52 that support the overhead canopy 50 are vertically movably on supports 94 that are secured to the opposite corners of the front and rear walls 49 and 51 of the compartment body portion 46. Each of the vertical members 52 includes a vertical row of spaced apertures 96. A selected one of the apertures of each member 52 are aligned with an aperture 98 extending through the corresponding support 94. With the selected one of the vertical member apertures 96 the relative position of the canopy 50 is then fixed by extending a suitable connecting means such as a bolt 100 through the aligned apertures and securing it by a nut to inmovably secure the vertical members 52 to the corresponding supports 94. With this arrangement the canopy 50 may be raised and lowered through a vertical range to permit variations in the vertical height between the canopy 50 and the bottom portion 46 of the compartment 40. Accordingly when operating in mines of lower mineral seam height, the canopy 50 may be lowered to permit vertical movement of the operator's compartment 40 on the vehicle body portion without striking the mine roof.

According to the provisions of the Patent Statutes, we have explained the principle, preferred construction and mode of operation of our invention and have illustrated and described what we now consider its best embodiments. However, it should be understood that, within the scope of the appended claims, the invention may be practiced otherwise than as specifically illustrated and described.

We claim:

1. A self-propelled vehicle for use in the mine comprising,
    a mobile body,
    traction means for propelling said mobile body along a mine floor,
    an operator's compartment positioned adjacent to said mobile body, and
    connecting means for slidably connecting said operator's compartment to said mobile body, said connecting means arranged to permit said operator's compartment to move upwardly and downwardly relative to said mobile body independently of the upward and downward movement of said mobile body as said mobile body with said operator's compartment connected thereto travels over the uneven undulating mine floor.

2. A self-propelled vehicle for use in a mine as set forth in claim 1 which includes,
    said operator's compartment having a body portion,
    a protective canopy positioned above said body portion, and
    means for supporting said protective canopy on said operator's compartment above said body portion thereof.

3. A self-propelled vehicle for use in a mine as set forth in claim 2 in which said means for supporting said canopy includes,
    a plurality of vertical members each secured at one end portion to said protective canopy, and
    means positioned on said operator's compartment body portion for securing the opposite end portions of said vertical members thereto to effect variations in the height of said protective canopy above said operator's compartment body portion.

4. A self-propelled vehicle for use in a mine as set forth in claim 1 in which,
    said operator's compartment includes a vertically extending side wall positioned adjacent to said mobile body portion side wall,
    said connecting means including a first member connected to said mobile body portion side wall and a second member connected to said operator's compartment side wall, and
    said second member supported by said first member for vertical movement thereon so that said operator's compartment moves upwardly and downwardly relative to said mobile body side wall as said mobile body with said operator's compartment connected thereto travels over the uneven undulating surface of the mine floor upon movement of the vehicle.

5. A self-propelled vehicle for use in a mine as set forth in claim 4 in which,
    said connecting means first member includes a guide plate secured to said mobile body side wall,
    said guide plate having a pair of vertically extending guideways,
    said connecting means second member including a pair of vertically extending guide rails secured to said operator's compartment side wall, and
    said guide rails positioned for vertical movement in said guideways so that said operator's compartment moves upwardly and downwardly relative to said vehicle body portion independently of the upward and downward movement of said mobile body as said compartment bottom portion contacts the uneven undulating mine floor.

6. A self-propelled vehicle for use in a mine as set forth in claim 1 in which said operator's compartment includes,
    a side wall on said operator's compartment positioned adjacent said mobile body,
    said operator's compartment having a front wall, rear wall and a bottom wall connected to said side wall,
    a protective canopy connected to and positioned above said operator's compartment side wall and said front and rear walls, and
    said operator's compartment bottom wall having rounded edge portions extending upwardly therefrom and connected to said side wall and said front and rear walls to facilitate sliding movement of said bottom wall on the surface of the mine floor.

7. A self-propelled vehicle for use in a mine as set forth in claim 1 which includes,
    said operator's compartment having a side wall positioned adjacent to said mobile body and front and rear walls connected to said side wall,
    a fender secured to said mobile body and surrounding one of said traction means positioned adjacent said front wall, and
    said connecting means arranged to connect said operator's compartment side wall to said mobile body and said operator's compartment front wall to said fender respectively.

8. A self-propelled vehicle for use in a mine as set forth in claim 7 which includes,
a plurality of vertical members movably secured at one end portion to said operator's compartment side wall and said front and rear walls,
a protective canopy secured to the opposite end portions of said vertical members and overlying said operator's compartment in substantially parallel relation to the mine roof to protect an operator in said compartment from dislodged material falling from the mine roof, and
means for securing said vertical members to said side wall and said front and rear walls to adjust the height of said protective canopy on said operator's compartment.

9. A self-propelled vehicle for use in a mine as set forth in claim 1 in which said connecting means includes,
a guide plate secured to said mobile body and positioned oppositely of said operator's compartment,
guide means provided on said guide plate for controlling the movement of said operator's compartment relative to said mobile body,
rail means secured to said operator's compartment for sliding engagement with said guide means to facilitate relative movement of said operator's compartment on said mobile body as the vehicle moves in the mine, and
stop means secured to said mobile body and said operator's compartment for limiting the downward movement of said operator's compartment on said mobile body.

10. A self-propelled vehicle for use in a mine as set forth in claim 9 in which said stop means includes,
a first flange member rigidly secured to and extending outwardly from said operator's compartment,
a second flange member rigidly secured to and extending outwardly from said mobile body,
said second flange member being positioned in spaced underlying relation with said first flange member such that upon downward movement of said operator's compartment to a preselected elevation below the level portion of the mine floor urges the first flange member into abutting relation with said second flange member to prevent further downward movement of said operator's compartment.

11. A self-propelled vehicle for use in a mine as set forth in claim 1 in which,
said mobile body includes a side wall with said operator's compartment positioned adjacent thereto,
said operator's compartment including a floor portion,
said connecting means slidably connecting said operator's compartment to said mobile body side wall so that the underside of said operator's compartment floor portion slides along the mine floor as the mobile body with the operator's compartment connected thereto travels over the uneven undulating mine floor.

12. A self-propelled vehicle for use in a mine as set forth in claim 11 in which,
said operator's compartment floor portion includes a front edge portion and a rear edge portion,
said operator's compartment slidably connected to said mobile body side wall so that said operator's compartment floor portion front edge portion and rear edge portion slides along the mine floor as the mobile body with the operator's compartment connected thereto travels over the uneven undulating mine floor.

13. A self-propelled vehicle for use in a mine comprising,
a mobile body,
traction means for propelling said mobile body along a mine floor,
a canopy positioned above an operator's compartment,
connecting means for slidably connecting said operator's compartment to said mobile body, said connecting means arranged to permit said canopy to move upwardly and downwardly relative to said mobile body independently of the upward and downward movement of said mobile body as said mobile body with said canopy connected thereto travels over the uneven undulating mine floor.

* * * * *

UNITED STATES PATENT OFFICE
CERTIFICATE OF CORRECTION

PATENT NO. : 4,078,629

DATED : March 14, 1978

INVENTOR(S) : Carl Kutay, Scott Wamsley, Henry B. DeLong

It is certified that error appears in the above-identified patent and that said Letters Patent are hereby corrected as shown below:

Line 6   After "the" (second instance) delete "mobile body";

Line 8   After "to the" add --mobile body--.

Signed and Sealed this

Twenty-second Day of January 1980

[SEAL]

Attest:

SIDNEY A. DIAMOND

Attesting Officer

Commissioner of Patents and Trademarks